United States Patent

Swift

[15] 3,703,645
[45] Nov. 21, 1972

[54] ELECTRONIC TIMING SYSTEM FOR MILKING

[72] Inventor: William C. Swift, P.O. Box 764, San Joaquin, Tex. 93660

[22] Filed: Jan. 18, 1971

[21] Appl. No.: 107,111

[52] U.S. Cl.................................307/154, 119/14.28
[51] Int. Cl.................................................A01j 5/14
[58] Field of Search............119/14.28; 307/149, 154

[56] References Cited

UNITED STATES PATENTS 3,117,553    1/1964    Dujardin et al.........119/14.28

FOREIGN PATENTS OR APPLICATIONS 278,572    8/1966    Australia................119/14.28

Primary Examiner—L. T. Hix
Attorney—John M. Koch

[57] ABSTRACT

A system for electronically controlling milking machines is disclosed which includes a clock pulse generator employing a multivibrator circuit to provide a periodic series of stable rectangular pulses of controlled frequency in a given frequency range. Two variable pulse width generators are series coupled to the clock pulse generator. Each of these includes a one-shot or monostable multivibrator circuit for independently varying the output pulse width within a period as determined by the frequency of the clock pulse generator. In this manner, the milk ratio can be controlled at the front and rear solenoids of the milking machine pulsators and thus at the front and the rear teats of the cow being milked. The front and rear milk ratio controls are independent of each other. An output control circuit is connected to each of the variable pulse width generators for periodically turning the solenoids of the milking machine pulsators on and off according to a desired timing relationship.

A power supply, including a transformer and a rectifier, supplies a stepwise variable direct current voltage to a voltage regulator for supplying a constant voltage to the clock pulse generator and the two variable pulse width generators for stabilized pulse output isolated from variations in power input line voltages. The power supply also provides a common voltage between the solenoids of the milking machine pulsators and the two output control circuits.

8 Claims, 3 Drawing Figures

INVENTOR.
WILLIAM C. SWIFT,
BY John M. Koch
ATTORNEY.

ELECTRONIC TIMING SYSTEM FOR MILKING

BACKGROUND OF THE INVENTION

1. Field of the Invention

This invention provides a system for electronically timing and controlling milking machines by providing means for timing and controlling the solenoids of milking machine vacuum pulsators which control the vacuum lines connected to the teat cups attached to the cow being milked.

2. Description of the Prior Art

Electromechanical timing mechanisms employing electric motor-driven cams to control milk ratios per cycle ad the number of cycles per minute or frequency of the solenoids in the vacuum pulsators have found wide usage in the art. The milk ratio is defined as the time milked divided by the total time per cycle which includes the time milked plus the rest time for each solenoid or teat actuated by a pulsator. The frequency at which a pulsator moves up and down normally is about 45 cycles per minute. The milk ratio is changed in the prior art motor-driven cam mechanism by changing the cam. This involves an inconvenient and time-consuming operation. Also, the results achieved by making this mechanical adjustment frequently are not as accurate and precise as desired by the dairy-man. Furthermore, the electric motor employed to drive the cam is affected by variations in the frequency of the power line from the normal 60 cycles per second which, in turn, affects the frequency of the solenoids of the pulsators. Thus a constant and repeatable frequency or milk ratio is not always obtained and reliability of results suffers.

U.S. Pat. No. 3,117,553 issued to J. A. J. A. Dujardin et al on Jan. 14, 1964 discloses the use of an electronic impulser to control a milking machine. The electronic control or timing system of the patent is, however, quite different from that of this invention. For example, the timing of all of the solenoids of the pulsators is step-wise and simultaneously controlled by the use of a four-position switch. Three discrete, step-wise ratios are obtained by three respective switch positions and no provision is made for independent milk ratios for front and rear solenoids of pulsators. In the control system of the instant invention, on the other hand, the use of two variable pulse width generators, each employing a one-shot or monostable multivibrator circuit, provides for the continuous variation of the pulse width at two separate points so that the milk ratio can precisely, accurately and continuously, be controlled at the front and rear solenoids of the pulsators independently of each other.

Thus the timing and control system of the instant invention provides for any desired combination of milk ratios for milking the front and rear teats of the cow separately. The milk ratio conveniently can be established and varied with great reliability and flexibility. The system is very adaptable and can be connected to any type of pulsater in use and is practically unaffected by variations in ambient temperature, atmospheric humidity input power line voltage or frequency, and the like. As the dairyman is able to accurately and precisely control the milk ratio, he is able to cope with mastitis and to maximize the yield of milk from his cows during all seasons of the year.

OBJECTS AND SUMMARY OF THE INVENTION

Accordingly, it is an object of the invention to provide a system for accurately, precisely and conveniently setting, changing, timing and controlling the milk ratio in a milking machine.

Another object of this invention is to provide such a system which is substantially free of instability or variation of its timing or control due to power line fluctuations in frequency or voltage.

A further object of this invention is to provide a system for timing and controlling a milking machine which is free from the disadvantages, inconveniences and unreliability of prior art electromechanical timing and control systems by providing a system which is free of mechanical parts such as motor-driven discs, cams, and the like.

A further object of the invention is to provide such a system which includes means for achieving independent timing and control of the milk ratio for milking the front and rear teats of a cow or other animal capable of being milked.

Additional objects of the invention will become apparent from a reading of the description of the invention given herein.

The objects of the invention are achieved by providing a solid state electronic system for timing and controlling a milking machine which includes a clock pulse generator for providing a series of rectangular pulses, a variable pulse width generator coupled with the clock pulse generator for varying the output pulse width within a period as defined by the clock pulse generator and an output control circuit coupled with the variable pulse width generator for continuously activating and deactivating solenoids of vacuum pulsators in the milking machine at a desired pulse width or frequency and to achieve a desired milk ratio. A power supply for supplying a direct current voltage between the solenoids of the vacuum pulsators and the output control circuit is connected to furnish power to a voltage regulator for supplying a constant voltage to the clock pulse generator and to the variable pulse width generator for stabilized pulse output independent of variation in voltage power obtained from the power supply.

In a preferred embodiment of the invention, a second variable pulse width generator is coupled in series with the first pulse width generator and a second output control circuit is coupled with the second variable pulse width generator so that two series of pulses are obtained from the system. The pulse width of each series of pulses can be varied as desired independently of each other and thus independently control the milk ratio at the front and rear teats, or the teats from side to side, of an animal during a milking operation.

The timing control achieved by the variable pulse width generator, or generators, discussed hereinabove preferably is accomplished with the use of a one shot or monostable multivibrator circuit in the variable pulse width generator, or in each of the variable pulse width generators when at least two are employed.

DESCRIPTION OF THE PREFERRED EMBODIMENTS

Figure 1:
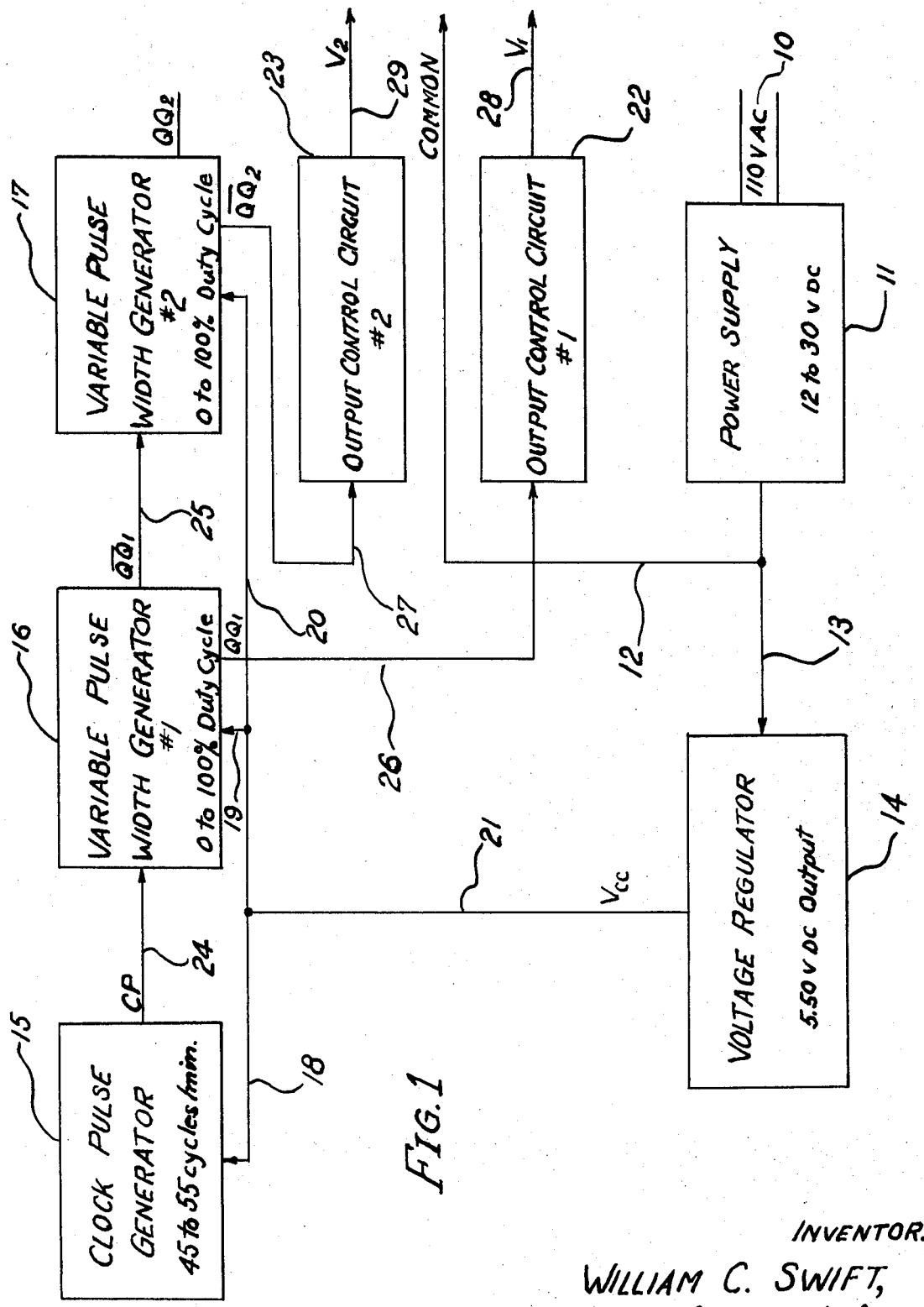
FIG. 1 is a block diagram showing a preferred embodiment of the electronic timing and control system of the invention.
Figure 3:
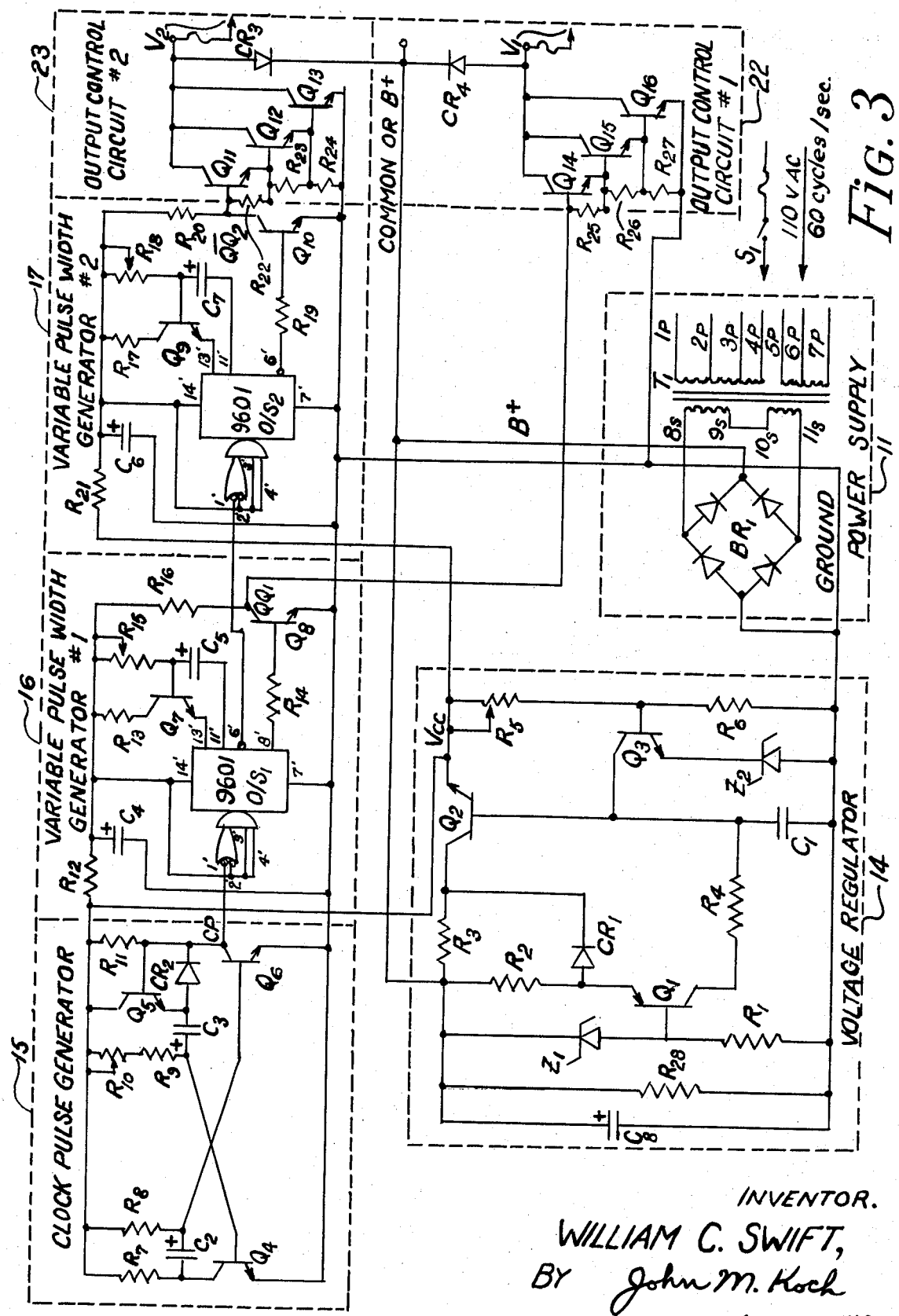
FIG. 3 is a schematic circuit diagram showing circuit details of various circuits employed in the preferred embodiment shown in block diagram form in FIG. 1.

A general overall description of the system of the invention is given with reference to the block diagram of FIG. 1 to be followed by a more detailed indepth description of the circuitry with reference to the circuit diagram of FIG. 3.

The system receives its power from the 110 volt ac, 60 cycles per second, line 10 through the power supply 11. Power supply 11 converts the 110 volt ac input into a low voltage, high amperage ac current through a step-down transformer and then converts this low voltage ac current into a dc current through a silicon bridge rectifier and filter capacitor for operating the solenoid vacuum pulsaters through line 12 and the electronic circuitry of the voltage regulator through line 13. Power supply 11 is built to furnish a dc voltage in discrete steps in the range from about 12 volts to about 30 volts at a current of about 12 amperes.

The output of power supply 11 is fed into the voltage regulator 14 through input line 13 and converted into a regulated voltage of 5.50 volts ±0.05 volt dc over the voltage input range of about 12 to about 30 volts dc received from power supply 11. This regulated 5.50 volts dc is supplied to the clock pulse generator 15, and the variable pulse width generators 16 and 17 through lines 18, 19 and 20, respectively, connected to output line 21 of voltage regulator 14. The regulated 5.50 volts dc is used so that any voltage variation in the output from power supply 11 will not affect the frequency of the clock pulse generator 15 or pulse width of the pulses supplied by variable pulse width generators 16 and 17 which drive the output control circuits 22 and 23.

In clock pulse generator 15, the clock pulse supplied to variable pulse width generator 16 through output line 24, is generated by using a transistor multivibrator circuit which produces a rectangular wave pulse. This rectangular wave pulse can be adjusted to a frequency in the range from about 45 to about 55 cycles per minute. The circuit of clock pulse generator 15 is temperature compensated in that its timing resistors are wirewound to have low temperature coefficients and tantalum timing capacitors are used so that the frequency of the pulses will remain constant over a wide temperature range.

Variable pulse width generators 16 and 17 are interconnected by line 25 and each contains an integrated circuit monostable multivibrator or one shot circuit. Each one shot circuit is connected to a precision tantalum timing capacitor and a variable resistor or potentiometer which is used to vary the pulse width of the output pulse at $QQ_1$ and its inverse $\overline{QQ}_1$ and the output pulse at $QQ_2$ and its inverse at $\overline{QQ}_2$ from the respective one shot circuit. Variable pulse width generators 16 and 17 are used to control the milk ratio from approximately zero to about 100 percent.

The output control circuits 22 and 23 each include two power transistors which are heat-sinked and a driving transistor. The pulses from variable pulse width generators 16 and 17 are fed into output control circuits 22 and 23, respectively, through lines 26 and 27, respectively. The output pulses from output control circuits 22 and 23 are fed through lines 28 and 29, respectively, to the vacuum pulsators to activate the solenoids therein. Thus, in milking machines having vacuum pulsators containing two solenoids or sides, each solenoid or side is activated separately. This permits separate and independent control and timing of the front and rear sides or teats of the cow with respect to the milk ratio.

Figure 2:
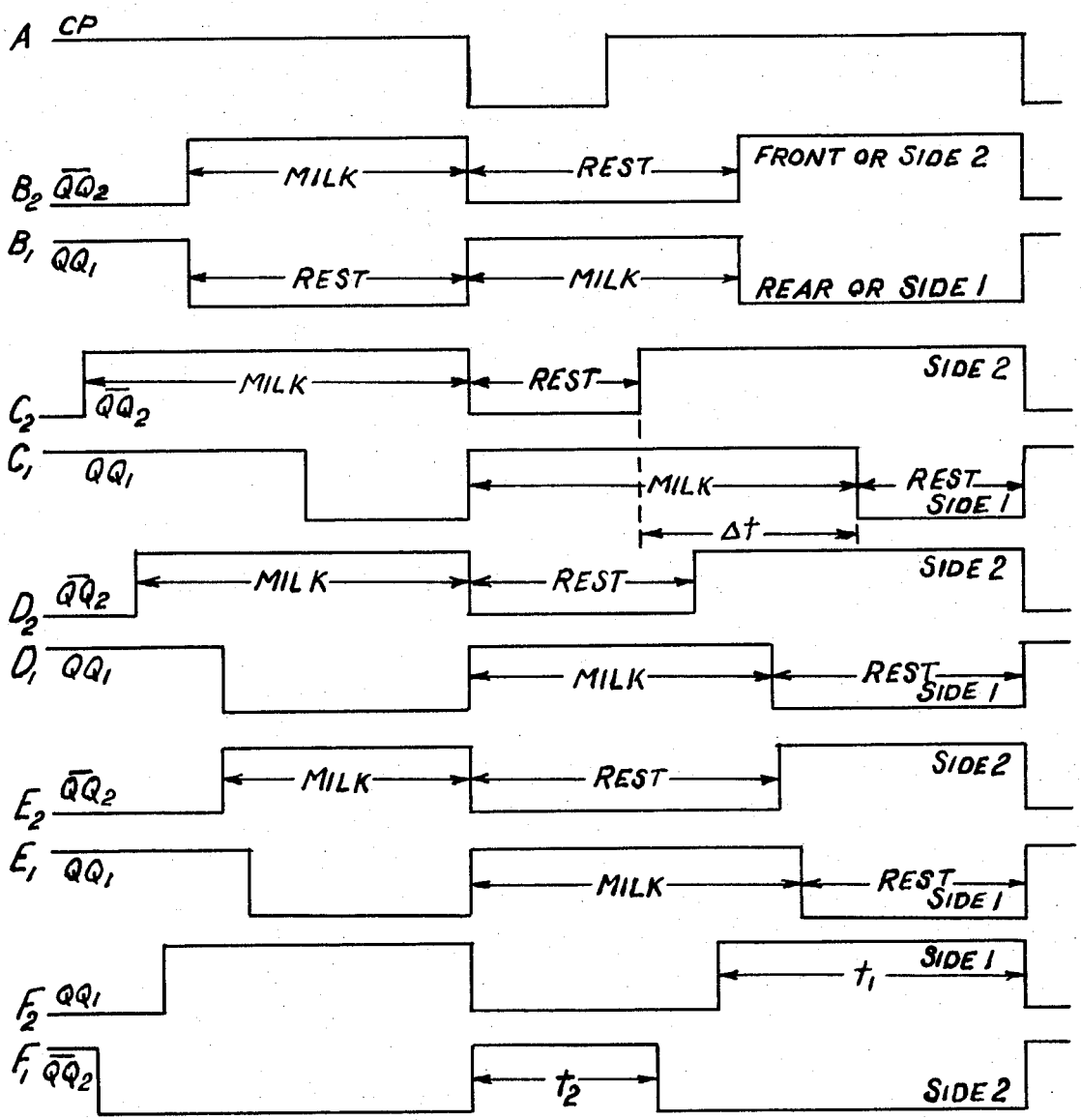
FIG. 2 is a voltage waveform diagram showing clock pulse waveforms and the corresponding various voltage output waveforms, as a function of time, employed in achieving different milk ratios.

This is shown by waveforms in FIG. 2. Waveform (A) shows the clock pulse output CP on line 24 of clock pulse generator 15 being fed into variable pulse width generator 16. Waveform ($B_1$) shows the output pulses at $QQ_1$ on line 26 from variable pulse width generator 16 fed to output control circuit 22 for a 50 per cent milk ratio and waveform ($B_2$) shows the waveform of output pulses at $\overline{QQ}_2$ on line 27 from variable pulse width generator 17 fed to output control circuit 23 for a 50 percent milk ratio. It will be seen in this case that the front teats are milked when the rear teats rest and vice versa. In this situation a more even vacuum level is maintained at the teat cups and a more constant flow of milk occurs than when all of the teats are milked at the same time and rested at the same time.

Similarly, waveforms ($C_1$) and ($C_2$) show the output pulses at $QQ_1$ and at $\overline{QQ}_2$, respectively, when both the front and rear teats are milked at a 70 per cent milk ratio. It will be noted that there is a part of the time when both the front and rear teats are milked together. This overlap time ($\Delta t$) normally should be minimized by starting to milk the rear teats after the milking of the front teats has been completed in each cycle to help maintain a more constant vacuum level and a more constant rate of milk flow from the claw.

This situation is more nearly achieved as shown by waveforms ($D_1$) and ($D_2$) obtained when the front teats are milked at a 60 percent milk ratio and the rear teats at a 55 percent ratio or waveforms ($E_1$) and ($E_2$) when the front teats are milked at a 45 percent ratio and the rear teats at a 60 percent ratio. ) when In a more detailed description of the circuitry of the timing and control system of the invention shown schematically in FIG. 3, it will be noted that 110 volt ac, 60 cycles per second line power is passed through a step-down transformer $T_1$ and converted into low voltage, high amperage alternating current. Transformer $T_1$ is a multiple coil transformer having a primary winding connected to terminals $1_p$, $2_p$, $3_p$ and $4_p$ and a separate winding connected to terminals $5_p$, $6_p$ and $7_p$ which can be used in series with the primary winding to raise or lower the secondary voltage output at terminals $8_s$ and $11_s$ with the help of tappings $9_s$ and $10_s$, respectively. Thus the voltage output between Common or B$^+$ and Ground can be varied in discrete steps from about 12 to about 30 volts dc.

With the input power line voltage at 110 to 120 volts ac and 50 to 60 cycles per second, the Common or B$^+$ voltage output can be changed so that a number of different commercially available vacuum pulsators or solenoids can be operated. The silicon bridge rectifier $BR_1$ together with filter capacitor $C_8$ is used to produce a direct current Common or $B^+$ voltage. Bleeder resistor $R_{28}$ is used to discharge capacitor $C_8$ when the power line voltage to transformer $T_1$ is turned off at switch $S_1$.

The purpose served by voltage regulator 14 is that of supplying a constant dc voltage to the multivibrator circuit of clock pulse generator 15 and to the timing control circuits of variable pulse width generators 16 and 17 to insure a more stabilized pulse output at points $V_1$ and $V_2$. Voltage regulator 14 is designed to provide a constant dc voltage at point $V_{cc}$ with a variation of the Common or $B^+$ dc input voltage to voltage regulator 14 over a range from about 12 to about 30 volts. The dc voltage $V_{cc}$ is adjusted at at $R_5$ to a value of about 5.5 volts and supplies about 60 to 70 ma of current.

Voltage regulator 14 also provides protection against over-current conditions by turning off transistor $Q_1$ when the voltage across resistor $R_3$ exceeds the voltage drop of Zener diode $Z_1$ plus the diode voltage drop across diode $CR_1$ or $6.2 + 0.6 = 6.8$ volts dc. By preventing the flow of collector current from transistor $Q_1$ when the voltage drop across resistor $R_3$ exceeds 6.8 volts dc, the base current to pass transistor $Q_2$ is cut off and no emitter current can flow from transistor $Q_2$. Hence, the occurence of an over-current condition turns off pass transistor $Q_2$. Thus, in the actual operation of voltage regulator 14, transistor $Q_1$ functions as a constant current source for the base current of pass transistor $Q_2$ and improved regulation of dc voltage with variations of the voltage at point $B^+$ is produced.

The purpose served by the multivibrator circuit of clock pulse generator 15 is to provide a series of stable periodic rectangular pulses at point CP which have an adjustable frequency between about 45 and 55 cycles per minute. The desired frequency of the pulses in this range is established by adjusting potentiometer $R_{10}$. The thus established pulse frequency at point CP is the frequency standard at which the vacuum pulsators or solenoids are actuated. The pulses at point CP have fast rise times due to the pulse shaping performed by the combination of transistor $Q_5$ and diode $CR_2$.

Variable pulse width generators 16 and 17 each contain a timing control circuit and together are used to provide the means for independently controlling the timing and the milk ratio at the front and rear solenoids in the vacuum pulsators and thus at the front and rear teats of the cow being milked. This timing control is achieved through the use of monostable multivibrator or one shot circuits $O/S_1$ and $O/S_2$ in pulse width generators 16 and 17, respectively, and is accomplished by producing a pulse width variation at points $QQ_1$ and $\overline{QQ_2}$ an independent, desired and selected amount.

This independent pulse width variation at points $QQ_1$ and $\overline{QQ_2}$ is described with reference to waveforms (F), ($F_1$) and ($F_2$) shown in FIG. 2 which show the timing relationship of the clock pulses (F) at point CP and the pulses ($F_1$) at point $\overline{QQ_2}$ and ($F_2$) at point $QQ_1$. The leading edges of the pulses waveforms ($F_1$) at point $\overline{QQ_2}$ will always occur at the respective trailing edges of the pulse waveforms ($F_2$) at point $QQ_1$. The time $t_1$ or pulse width, of pulses at point $QQ_1$ is adjusted an independent, desired, and selected amount by simply turning the potentiometer $R_{15}$ a proper amount and thus changing the external time constant of one shot circuit $O/S_1$ the desired amount.

Similarly, the time $t_2$, or pulse width, of pulses at point $\overline{QQ_2}$ is adjusted an independent, desired and selected amount by simply turning the potentiometer $R_{18}$ an appropriate amount and thus producing a desired change in the external time constant of one shot circuit $O/S_2$. The result of changing the pulse times or pulse widths $t_1$ and $t_2$ is to correspondingly change the duty or milking cycles at points $QQ_1$ and $\overline{QQ_2}$, respectively, which, in turn, results in a corresponding change in the milk ratios at the front and rear teats of the cow being milked, as described below.

The purpose served by output control circuits 22 and 23 is to turn on and off the solenoids in the vacuum pulsators in accordance with the timing and pulse width relationships shown and described above and to thus establish the desired, independent and selected milk ratios. The transistors $Q_{14}$, $Q_{15}$ and $Q_{16}$ of output control circuit 22 are connected in a darlington configuration to provide the necessary load current for activating the solenoids of the vacuum pulsators. The solenoids are connected between point $V_1$ and point $B^+$ and between point $V_2$ and point $B^+$.

In some types of milking machines in use each vacuum pulsator has two solenoids designated in FIG. 2 as side 1 or rear and side 2 or front. In other types of milking machines each vacuum pulsator contains only one solenoid and in such cases side 1 and side 2 designates two separate vacuum pulsators. A number of vacuum pulsators are controlled by the instant system by connecting one set of them in parallel relationship with each other and with points $V_1$ and $B^+$ and a second set of them in parallel relationship with each other and with points $V_2$ and $B^+$ as in understood in the art. About 16 vacuum pulsators can be operated by the present system. The diodes $CR_3$ and $CR_4$ are used to clamp the voltages at points $V_1$ and $V_2$, respectively, to $B^+$ voltage when the back emf of the solenoids appears upon turning off the solenoids.

While I have herein shown and described my invention in what I have conceived to be the most practical and preferred embodiment, it is recognized that departures can be made therefrom within the scope of my invention which is not to be limited to the details disclosed herein, but is to be accorded the full scope of the claims so as to embrace any and all equivalent structure.

I claim:

1. A system for electronically controlling milking machines which comprises:

a clock pulse generator for providing a series of rectangular pulses, a variable pulse width generator coupled with the clock pulse generator said variable pulse width generator including a monostable multivibrator circuit and the pulse width of the pulse width generator output pulses being determined by the setting of a potentiometer to determine the external time constant of the monostable multivibrator circuit and thus determine a desired milk ratio for varying the output pulse width within a period as defined by the clock pulse generator, a output control circuit coupled with the variable pulse width generator for continuously activating and deactivating solenoids of vacuum pulsators in a milking machine at a desired pulse width to achieve a desired milk ratio, a voltage regulator in the system for supplying a constant voltage to the clock pulse generator and to the variable pulse width generator for achieving stabilized pulse output independent of variation in voltage power supplied thereto, and a power supply circuit in the system for supplying a direct current voltage between the solenoids of the vacuum pulsators and the output control circuit and for furnishing power to the voltage regulator.

2. A system for electronically controlling milking machines according to claim 1 wherein said output control circuit includes three transistors connected in a darlington configuration to provide the load current for actuating the solenoids of the vacuum pulsators.

3. A system for electronically controlling milking machines according to claim 1 wherein a second variable pulse width generator is coupled in series with the first variable pulse width generator and a second output control circuit is coupled with the second variable pulse width generator for producing two series of pulses from the system, the pulse width of each of said series of pulses being capable of being varied as desired independently of each other for independently controlling the milk ratio at the front and rear, or from side to side, teats of an animal during milking operation.

4. A system for electronically controlling milking machines according to claim 3 wherein said clock pulse generator includes a multivibrator circuit provided with a potentiometer for adjusting the frequency of the pulses provided by the said clock pulse generator and thus the frequency of the solenoids of the vacuum pulsators.

5. A system for electronically controlling milking machines according to claim 3 wherein said variable pulse width generators each include a monostable multivibrator circuit and the pulse widths of the two series of output pulses of the pulse width generators are determined independently of each other by the setting of a potentiometer in each monostable multivibrator circuit to determine the respective external time constants of the monostable multivibrator circuits and thus determine the desired respective milk ratios independently of each other at the front and rear, or from side to side, teats of the animal being milked.

6. A system for electronically controlling milking machines according to claim 3 wherein said output control circuits each include three transistors connected in a darlington configuration to provide the load current for activating the solenoids of the vacuum pulsators.

7. A system for electronically controlling milking machines according to claim 3 wherein said variable pulse width generators each include a monostable multivibrator circuit and the pulse widths of the two series of output pulses of the variable pulse width generators are determined independently of each other by the respective settings of a potentiometer in each monostable multivibrator circuit, and said output control circuits each include three transistors connected in a darlington configuration to provide the load current for activating the solenoids of the vacuum pulsators.

8. A system for electronically controlling milking machines according to claim 3 wherein said clock pulse generator includes a multivibrator circuit provided with a potentiometer for adjusting the frequency of the pulses provided by the said clock pulse generator, said variable pulse width generators each include a monostable multivibrator circuit and the pulse widths of the two series of output pulses of the pulse width generators are determined independently of each other by the respective settings of a potentiometer in each monostable multivibrator circuit, and said output control circuits each include three transistors connected in a darlington configuration to provide the load current for activating the solenoids of the vacuum pulsators.

* * * * *